United States Patent
Grifoni

(10) Patent No.: US 10,797,496 B2
(45) Date of Patent: Oct. 6, 2020

(54) MODULAR CHARGING STATION

(71) Applicant: Rufus Labs, Inc., West Hollywood, CA (US)

(72) Inventor: Gabriel Grifoni, Los Angeles, CA (US)

(73) Assignee: Rufus Labs, Inc.

( * ) Notice: Subject to any disclaimer, the term of this patent is extended or adjusted under 35 U.S.C. 154(b) by 3 days.

(21) Appl. No.: 15/969,513

(22) Filed: May 2, 2018

(65) Prior Publication Data

US 2019/0341791 A1    Nov. 7, 2019

(51) Int. Cl.
*H02J 7/00* (2006.01)

(52) U.S. Cl.
CPC .......... *H02J 7/0045* (2013.01); *H02J 7/0027* (2013.01)

(58) Field of Classification Search
CPC ........................................................ H02J 7/00
See application file for complete search history.

(56) References Cited

U.S. PATENT DOCUMENTS

| | | | |
|---|---|---|---|
| 3,696,283 A | 10/1972 | Ackley, III | |
| 4,672,292 A | 6/1987 | Hernandez | |
| 4,739,242 A | 4/1988 | McCarty et al. | |
| 5,656,914 A | 8/1997 | Nagele et al. | |
| 5,847,541 A | 12/1998 | Hahn | |
| 6,204,632 B1 | 3/2001 | Nierescher et al. | |
| 6,265,845 B1* | 7/2001 | Bo | H02J 7/0044 320/113 |
| 8,054,042 B2 | 11/2011 | Griffin et al. | |
| 8,183,825 B2* | 5/2012 | Sa | H02J 7/0044 320/107 |
| 8,400,104 B2* | 3/2013 | Adamczyk | H02J 7/025 320/108 |
| 2006/0208697 A1* | 9/2006 | Chan | H02J 7/0027 320/116 |
| 2015/0028797 A1 | 1/2015 | Miller et al. | |
| 2016/0322858 A1 | 11/2016 | Miller et al. | |
| 2017/0141594 A1 | 5/2017 | Burman et al. | |

* cited by examiner

*Primary Examiner* — Robert Grant
(74) *Attorney, Agent, or Firm* — Tsircou Law, P.C.

(57) ABSTRACT

A modular charging station is disclosed as configured with a plurality of charging ports that enable a mobile device, mobile device removable battery, and mobile device auxiliary component to be charged simultaneously. One or more of the charging ports can be disposed on a removable base that is configured to be inserted within a bay in the charging station. Furthermore, the charging station is configured to physically and electrically connect to another charging station, wherein a plurality of charging stations can be connected to one another in series, and a single power source connection can supply power to charge all components connected to any charging port in the chain of linked charging stations.

11 Claims, 4 Drawing Sheets

MODULAR CHARGING STATION

FIELD OF THE INVENTION

The present invention relates generally to mobile device chargers and, more particularly, to a charging station for simultaneously charging a mobile device and respective auxiliary components.

BACKGROUND OF THE INVENTION

A major hindrance to enjoying any functional benefit of a mobile device is a dead battery. Other complications such as poor network reception, or a cracked screen still enable the user to perform some functions of a mobile device, where as a dead battery simply displays a black screen offering no hope to the user. The threat of a dead battery has somewhat been alleviated due to the increasing battery life included with mobile devices, and the often convenient accessibility to a power supply in case a battery is needed to be re-charged.

For the hand held mobile device used by the consumer, re-charging a mobile device battery can be a simple routine exercise at the end of each day. However, where mobile devices are used more rigorously, such as those devices that are streamlined into a workplace environment, charging a mobile device can be a messy and inefficient use of resources and space. Some companies contain teams of mobile workers that require the use of a mobile device for their job duties. These mobile devices in turn may contain auxiliary devices, such as detachable batteries that can be swapped throughout a given work shift so as to minimize downtime due to waiting for a device to be charged, or other auxiliary components, such as a scanner as used in the retail industry. Thus, a given mobile worker may be required to charge a mobile device, auxiliary batteries, and other auxiliary devices at the end of a work shift in order to be prepared for the following work shift. A company containing teams of mobile workers using such mobile devices and auxiliary devices will require an enormous amount of power supply connections and chargers to charge all the devices simultaneously.

Existing charging stations fail to efficiently charge a set of mobile devices and corresponding auxiliary devices. One example of an existing charging station enables a mobile device to be charged simultaneously with an auxiliary battery. However, the charging station is unable to link any additional charging stations together, thereby requiring each mobile device set to be charged separately from another mobile device set. Moreover, the charging station is unable to charge any auxiliary devices contained by the mobile device aside from a battery. Another example of an existing charging station enables various types of charging units to be linked to a common power supply. However, each charging unit is capable of charging only one type of device, thereby requiring a mobile device to potentially be charged separately from its auxiliary devices since they must be individually linked.

It should, therefore, be appreciated that there exists a need for a modular charging station capable of simultaneously charging multiple sets of mobile devices and corresponding auxiliary devices using a single power source connection. The present invention fulfils this need and others.

SUMMARY OF THE INVENTION

Briefly, and in general terms, the invention provides a charging station configured with a plurality of charging ports that enable a mobile device and its auxiliary components to be charged simultaneously. The charging station is further configured to physically and electrically connect to another charging station, wherein a plurality of charging stations can be connected to one another, thereby enabling a single power source connection to supply power to charge all components connected to any charging port in the chain of linked charging stations.

More specifically, by example and not limitation, the plurality of charging ports, contained by a single charging station, are each located within a respective charging pocket, wherein each charging pocket is configured to receive a specific type of device or battery. A first charging pocket can be designed to receive a mobile device. A second charging pocket can be designed to receive a battery detached from the mobile device. A third charging pocket can be designed to receive an auxiliary component of the mobile device.

In another detailed aspect of an exemplary embodiment, one or more charging ports and the corresponding pocket(s) are located within a base that is detachable from the charging station.

In yet another detailed aspect of an exemplary embodiment, the charging station includes a power connection port that is configured to connect to a power source, such as a power outlet connected using a power supply cord. The power connection port is located within a dock connector that protrudes the side of the charging station.

In yet another detailed aspect of an exemplary embodiment, the dock connector enables two charging stations to be physically and electrically connected to each other. With a first charging station connected to a power source, the dock connector of a second charging station can be inserted into a docking receiver of the first charging station, wherein the docking receiver can contain a power input plug that can be connected to the power connection port of the second charging station dock connector. As such, power can be supplied to both charging stations via the power source connection to the first charging station. Moreover, a plurality of charging stations can be connected via successive linkages between a dock connector of one charging station and a docking receiver of the adjacent charging station.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
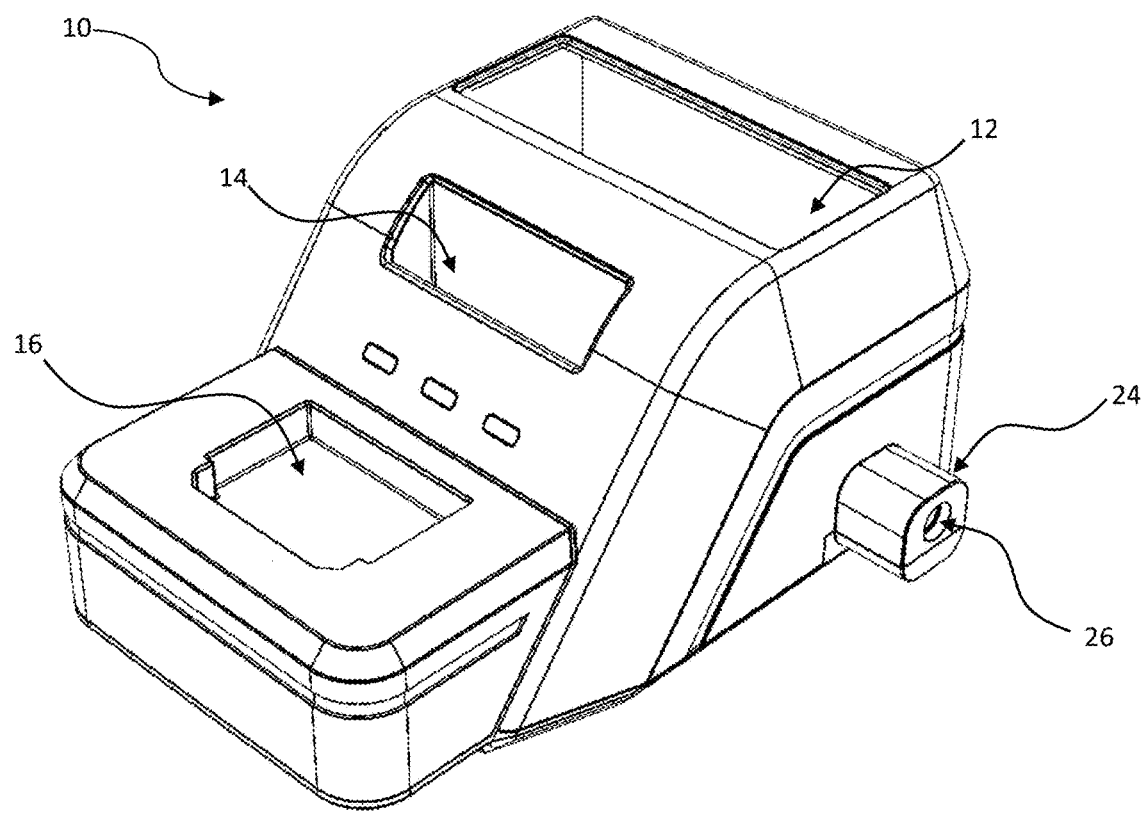
FIG. 1 is an right-side perspective view of a charging station in accordance with the invention depicting a plurality of charging pockets, a dock connector, and power connection port.
Figure 2:
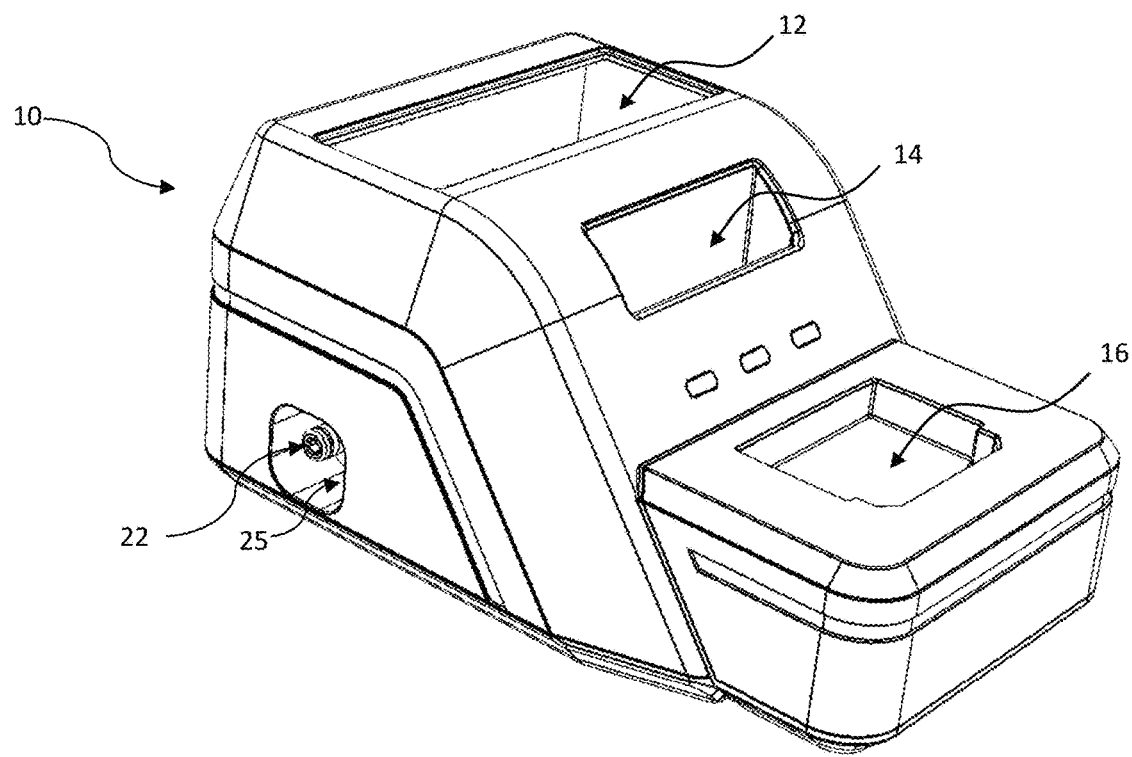
FIG. 2 is an left-side perspective view of the charging station of FIG. 1 depicting a plurality of charging pockets, a docking receiver, and power input plug.
Figure 3:
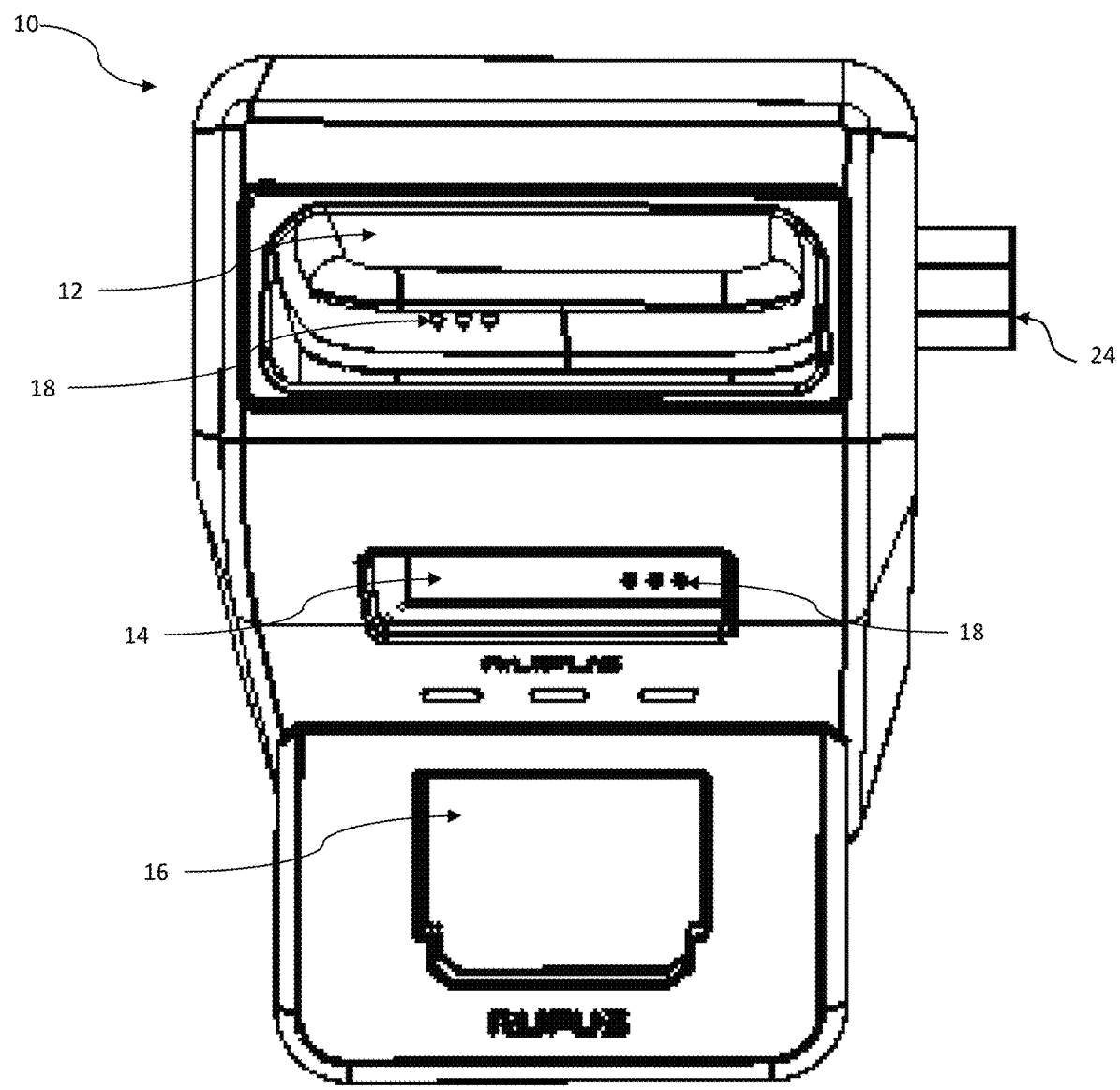
FIG. 3 is a top view of the charging station of FIG. 1 depicting a plurality of charging ports within a respective charging pocket.
Figure 6:
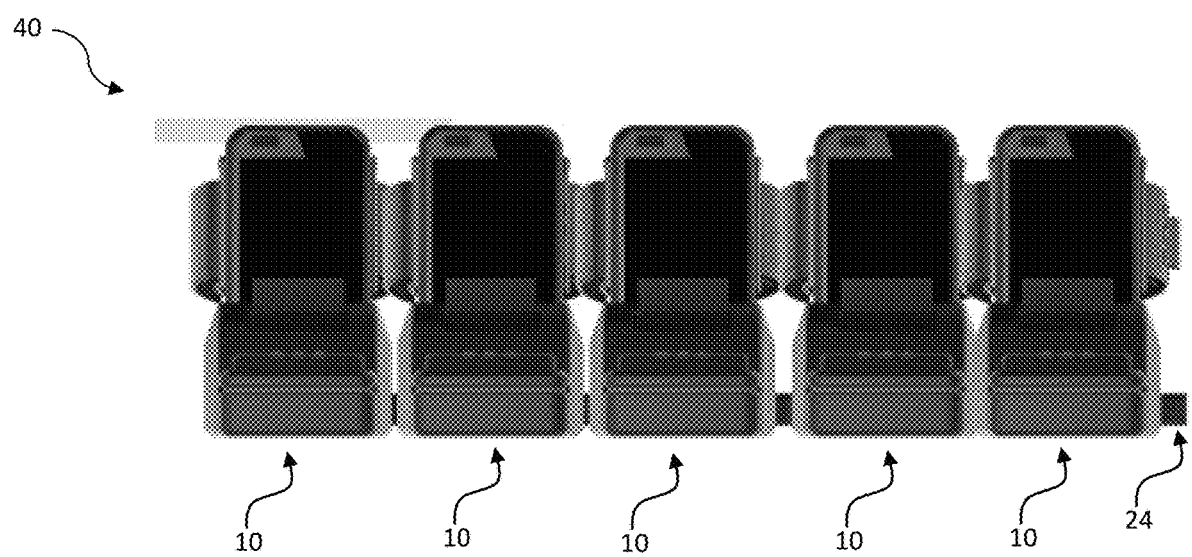
FIG. 6 is a front view of the charging station of FIG. 1 linked in series with a plurality of other charging stations

Referring now to the drawings, and particularly FIGS. 1-3, there is shown a charging station 10 configured with a plurality of charging ports 18 for charging a mobile device and it auxiliary components. Each charging port 18 is located within a respective charging pocket 12,14,16, enabling the respective mobile device or auxiliary component to be inserted and secure when charging. As such, the charging station 10 enables a plurality of different types of devices to be charged simultaneously. Moreover, referring to FIG. 6, a plurality of charging stations 40 can be connected to one another, such that multiple sets of devices can be charged simultaneously while using a single power source connection. Thus, the charging station provides for a space-efficient and economical means of charging multiple mobile devices and the respective auxiliary components.

Figure 4:
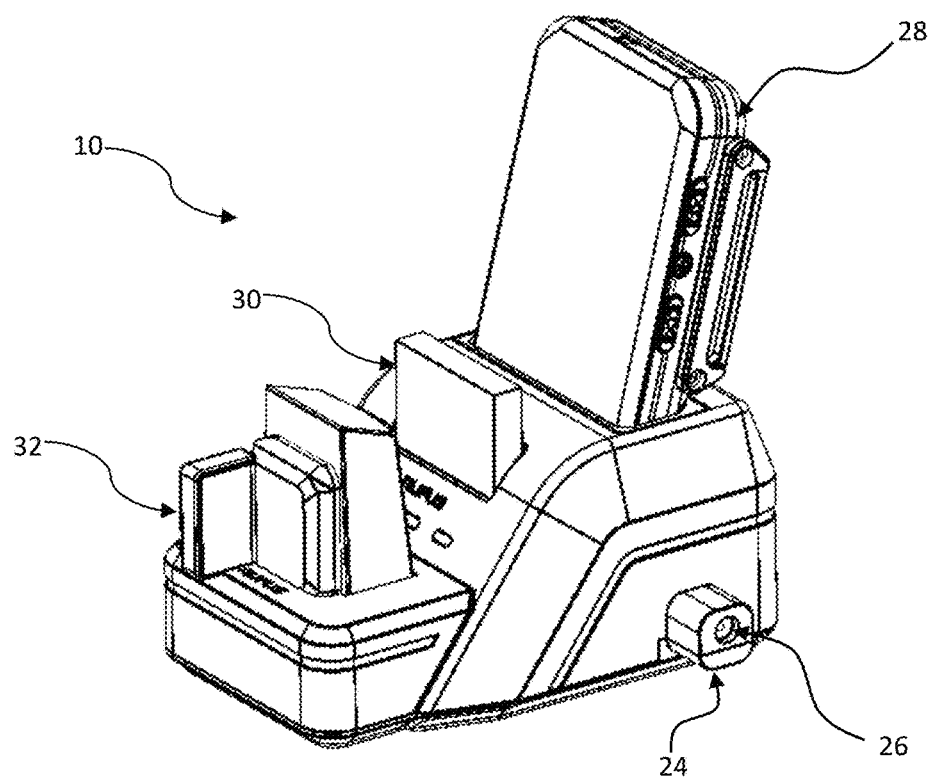
FIG. 4 is an right-side perspective view of the charging station of FIG. 1 depicting a mobile device, mobile device battery, and an auxiliary device inserted into a respective charging pocket.

With reference now to FIG. 3, the exemplary charging station 10 embodiment is depicted for receiving and securing 1) a mobile device in a first charging pocket 12, 2) a detachable mobile device battery in a second charging pocket 14, and 3) an auxiliary component relating to the mobile device in a third charging pocket 16. An exemplary charging station with devices inserted is depicted in FIG. 4, wherein the mobile device 28 is a wearable device, which contains a detachable battery 30 that can be charged simultaneously with a permanent internal battery located within the mobile device 28. The auxiliary components can vary depending on the mobile device. As depicted in FIG. 4, there is shown a scanner 32, associated with the mobile device, as being inserted into the charging station 10, wherein an internal battery within the scanner 32 will be charged. Each charging port 18 contains respective electrical contacts that is configured to mate with electrical contacts disposed on the respective device or component, thereby enabling the device/component to receive power for charging the respective battery. In certain embodiments, the removable batter can be charged while still housed with the mobile device.

Figure 5:
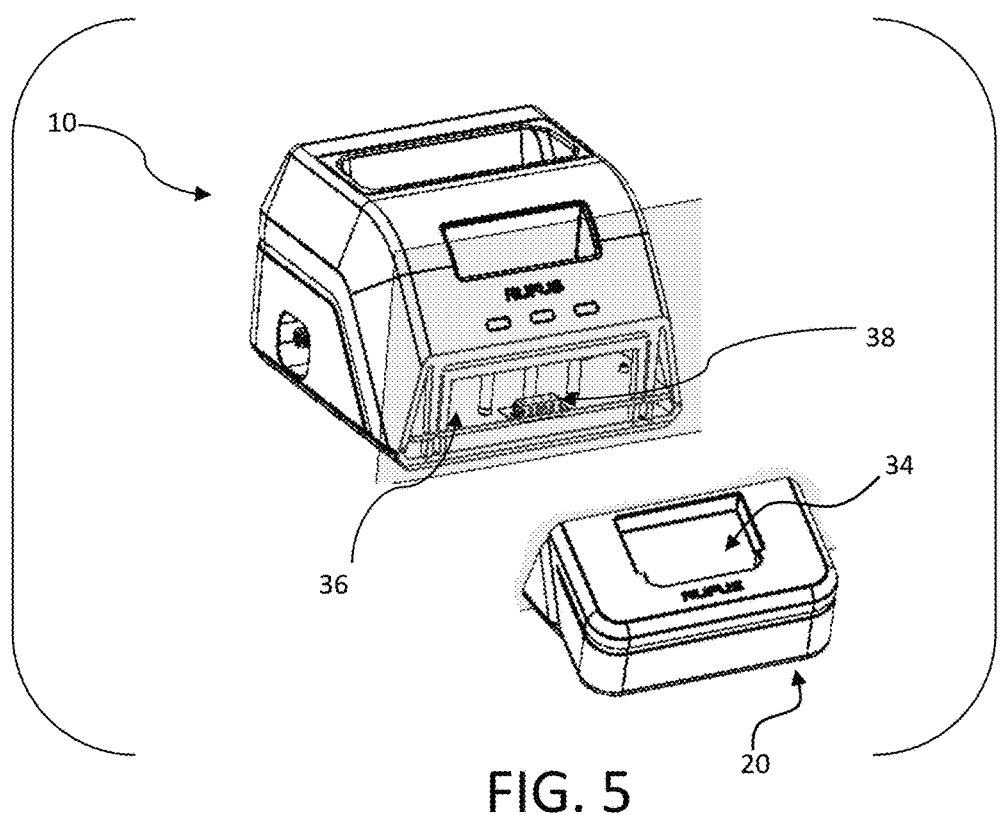
FIG. 5 is an exploded view of the charging station of FIG. 1, depicting a removable base with a corresponding charging port detached from the charging station.

Referring to FIG. 5, in an exemplary embodiment, one or more pockets 34 can be embodied in a detachable base 20 that can be inserted into a charging station bay 36, wherein the detachable base 20 can link with a charging station 10 using a standard USB connection 38.

With reference now to FIG. 1, the charging station 10 contains a power connection port 26 to receive power input from a power source. The power source can be a variety of sources, including a power outlet and/or a portable battery. The power connection port 26 is configured to receive input from a power cord, such as DC plug input, thereby facilitating as an interface between the charging station and power supply. Moreover, the power connection port 26 is electrically linked to all charging ports 18, i.e. electrical contacts, and USB connectors within the respective charging station.

With reference to FIGS. 1-3, the charging station 10 contains 1) a dock connector 24, which houses the power connection port 26, and 2) a docking receiver 25, which houses a power input plug 22. The docking receiver 25 of a first charging station is configured to receive the dock connector 24 of a second charging station, thereby physically securing the respective charging stations to each other. Moreover, the aforementioned dock connector 24 and docking receiver connection 25 enables the power input plug 22 of the first charging station to connect with the power connection port 26 of the second charging station, thereby electrically linking the two respective charging stations with each other. As such, a power source connection to the first charging station will also supply power to the second charging station. Furthermore, a plurality of charging stations can be connected together in series using the respective dock connector 24 and docking receiver 25 of adjacent charging stations, wherein a first charging station connected to a power source enables the plurality of charging stations to receive power so as to charge the devices connected to the respective charging ports 18. In the exemplary embodiment, a maximum of five charging stations may be connected to a single power supply connection.

It should be appreciated from the foregoing that the present invention provides a modular charging station configured with a plurality of charging ports that enable a mobile device, a mobile device removable battery, and a mobile device auxiliary component to be charged simultaneously. One or more of the charging ports can be disposed on a removable base that is configured to be inserted within a bay in the charging station. Furthermore, the charging station is configured to physically and electrically connect with another charging station, wherein a plurality of charging stations can be connected to one another in series, and a single power source connection can supply power to charge all components connected to any charging port in the chain of linked charging stations.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:
1. A modular charging station, comprising:
a charging base body having a front wall, back wall, top wall, a first side wall, and a second side wall, the top wall defining a plurality of charging pockets having charging ports therein for supplying power to a device inserted into the respective pocket of the plurality of pockets, including a first charging pocket sized to receive a mobile device having an internal battery and a removable battery and to charge the internal battery, and a second charging pocket sized to receive and to charge the removable battery of the mobile device;

a docking receiver disposed on the first side wall of the charging base body configured to receive a power input plug, the docking receiver electrically coupled to the plurality of charging ports;

a dock connector protruding the first side wall of the charging base body, the dock connector is configured to mate with a docking receiver of a second charging station, the docking connector configured to connect and supply power to the a docking receiver of the second charging station; and a detachable auxiliary base removably coupled to the front wall of the charging base body, the auxiliary base body defining an auxiliary pocket that contains a plurality of auxiliary electrical contacts electrically coupled to the dock connector for supplying power to a device inserted into the auxiliary pocket the auxiliary pocket is disposed in front of the second charging pocket, such that the first charging pocket, the second charging pocket and the auxiliary pocket are aligned with each other.

2. The modular charging station defined in claim 1, wherein the charging base body defines a bay to receive and secure the auxiliary base.

3. The modular charging station defined in claim 2, wherein the auxiliary base contains a USB cord configured to connect to a USB input slot disposed on the charging base body.

4. The modular charging station defined in claim 1, wherein the charging station is configured to be coupled with four other charging stations in series using the respective dock connectors and docking receivers, enabling power distribution to all charging stations via a single external power source connection.

5. The modular charging station defined in claim 1, wherein the front wall is sloped.

6. A modular charging station, comprising:

a charging base body having a front wall, back wall, top wall, a first side wall, and a second side wall, the top wall defining a plurality of charging pockets having charging ports therein for supplying power to a device inserted into the respective pocket of the plurality of pockets, including a first charging pocket sized to receive a mobile device having an internal battery and a removable battery and to charge the internal battery, the first charging pocket having charging ports disposed on a side wall of the first charging pocket aligned to connect with the mobile device upon insertion to charge the internal battery, and a second charging pocket disposed in front of the first charging port and sized to receive and to charge the removable battery of the mobile device;

a docking receiver disposed on the first side wall of the charging base body configured to receive a power input plug, the docking receiver electrically coupled to the plurality of charging ports;

a dock connector protruding the first side wall of the charging base body, the dock connector is configured to mate with a docking receiver of a second charging station, the docking connector configured to connect and supply power to the a docking receiver of the second charging station; and a detachable auxiliary base removably coupled to the front wall of the charging base body, the auxiliary base body defining an auxiliary pocket that contains a plurality of auxiliary electrical contacts electrically coupled to the dock connector for supplying power to a device inserted into the auxiliary pocket, the auxiliary pocket is disposed in front of the second charging pocket, such that the first charging pocket, the second charging pocket and the auxiliary pocket are aligned with each other, wherein the front wall is sloped and the auxiliary base has a back wall with a slope conformably matched.

7. The modular charging station defined in claim 6, wherein the auxiliary pocket is below the second charging pocket.

8. The modular charging station defined in claim 6, wherein the charging base body defines a bay to receive and secure the auxiliary base.

9. The modular charging station defined in claim 8, wherein the auxiliary base contains a USB cord configured to connect to a USB input slot disposed on the charging base body.

10. The modular charging station defined in claim 6, wherein the charging station is configured to be coupled with four other charging stations in series using the respective dock connectors and docking receivers, enabling power distribution to all charging stations via a single external power source connection.

11. The modular charging station defined in claim 6, wherein the front wall is sloped and the auxiliary base has a back wall with a slope conformably matched.

* * * * *